US008301731B2

(12) United States Patent
Naimark et al.

(10) Patent No.: US 8,301,731 B2
(45) Date of Patent: Oct. 30, 2012

(54) SOURCE-BASED ALERT WHEN STREAMING MEDIA OF LIVE EVENT ON COMPUTER NETWORK IS OF CURRENT INTEREST AND RELATED FEEDBACK

(75) Inventors: Michael Naimark, Long Island City, NY (US); Stephen DeBerry, East Palo Alto, CA (US); Ignazio Moresco, San Francisco, CA (US)

(73) Assignee: University of Southern California, Los Angeles, CA (US)

( * ) Notice: Subject to any disclaimer, the term of this patent is extended or adjusted under 35 U.S.C. 154(b) by 0 days.

(21) Appl. No.: 13/048,767

(22) Filed: Mar. 15, 2011

(65) Prior Publication Data

US 2011/0167136 A1 Jul. 7, 2011

Related U.S. Application Data

(62) Division of application No. 12/146,312, filed on Jun. 25, 2008, now Pat. No. 7,930,420.

(60) Provisional application No. 60/946,061, filed on Jun. 25, 2007.

(51) Int. Cl.
*G06F 15/16* (2006.01)
(52) U.S. Cl. ...................................................... 709/219
(58) Field of Classification Search ................... 709/219
See application file for complete search history.

(56) References Cited

U.S. PATENT DOCUMENTS

| | | |
|---|---|---|
| 5,189,630 A | 2/1993 | Barstow et al. |
| 5,828,809 A | 10/1998 | Chang et al. |
| 6,185,527 B1 | 2/2001 | Petkovic et al. |
| 6,513,003 B1 | 1/2003 | Angell et al. |
| 6,556,989 B1 | 4/2003 | Naimark et al. |
| 6,564,380 B1 | 5/2003 | Murphy |
| 6,694,352 B1 | 2/2004 | Omoigui |
| 6,721,744 B1 | 4/2004 | Naimark et al. |
| 6,757,682 B1 | 6/2004 | Naimark et al. |
| 7,403,224 B2 | 7/2008 | Fuller et al. |
| 7,930,420 B2 | 4/2011 | Naimark et al. |

(Continued)

FOREIGN PATENT DOCUMENTS

WO 2009003055 A1 12/2008

OTHER PUBLICATIONS

Qik, Inc. "Frequently Asked Questions," publicly posted Dec. 13, 2007, retrieved from archive.org. 3 pages.

(Continued)

*Primary Examiner* — George C Neurauter
(74) *Attorney, Agent, or Firm* — McDermott Will & Emery LLP

(57) ABSTRACT

A real time streaming video capture, delivery, and alert system may capture a streaming video of a live event and deliver it into a computer network as the live event is being captured. The system may include a camera, a network interface, a source operator interface configured to receive alerts, and a processing system. The system may issue an alert when the live event is currently of interest.

A streaming video search engine may allow prospective viewers to locate at least one streaming video that is currently of interest from among several streaming videos. The engine may include a network interface configured to receive source alerts from real time streaming video capture, delivery, and alert systems, a memory system, a processing system, a searching system, and a viewer interface.

18 Claims, 4 Drawing Sheets

U.S. PATENT DOCUMENTS

| | | |
|---|---|---|
| 2002/0056123 A1 | 5/2002 | Liwerant et al. |
| 2003/0018799 A1 | 1/2003 | Eyal |
| 2003/0063125 A1 | 4/2003 | Miyajima et al. |
| 2004/0210555 A1 | 10/2004 | Naimark et al. |
| 2005/0034158 A1 | 2/2005 | DeLaVega |
| 2005/0198006 A1 | 9/2005 | Boicey et al. |
| 2005/0210512 A1 | 9/2005 | Anderson, Jr. et al. |
| 2005/0246742 A1 | 11/2005 | Benco et al. |
| 2006/0047701 A1 | 3/2006 | Maybury et al. |
| 2007/0196806 A1 | 8/2007 | Ljungman et al. |
| 2008/0072247 A1 | 3/2008 | Barnard |
| 2008/0112315 A1 | 5/2008 | Hu et al. |
| 2008/0320159 A1 | 12/2008 | Naimark et al. |
| 2009/0019176 A1 | 1/2009 | Debrosse |
| 2009/0089294 A1 | 4/2009 | Davis et al. |
| 2009/0148124 A1 | 6/2009 | Athsani et al. |

OTHER PUBLICATIONS

International Search Report, mailed Oct. 2, 2008, for PCT Application Serial No. PCT/US08/68222, filed Jun. 25, 2008 (published as WO 2009003055 A1, International Application corresponding to U.S. Appl. No. 12/146,312, parent to U.S. Appl. No. 13/048,767), entitled "Source-Based Alert When streaming Media of Live Event on Computer Network is of Current Interest and Related Feedback."

SOURCE-BASED ALERT WHEN STREAMING MEDIA OF LIVE EVENT ON COMPUTER NETWORK IS OF CURRENT INTEREST AND RELATED FEEDBACK

CROSS-REFERENCE TO RELATED APPLICATION(S)

This application is a divisional application of U.S. application Ser. No. 12/146,312, filed, Jun. 25, 2008 (now U.S. Pat. No. 7,930,420 B2, issued Apr. 19, 2011), entitled "Source-Based Alert When Streaming Media of Live Event on Computer Network Is of Current Interest and Related Feedback," which is based upon and claims priority to U.S. Provisional Patent Application No. 60/946,061, entitled "HARDWARE-EMBEDDED ALERT AND FEEDBACK SYSTEM FOR ITEMS OF CURRENT INTEREST VIA A NETWORK," filed Jun. 25, 2007. This application is also related to U.S. Provisional Patent Application No. 60/816,751, entitled "HARDWARE-EMBEDDED ALERT AND FEEDBACK SYSTEM FOR ITEMS OF CURRENT INTEREST VIA A NETWORK," filed Jun. 26, 2006, as well as U.S. Pat. Nos. 6,757,682, 6,721,744, and 6,556,989. The content of all of these provisional and utility patent applications and patents is incorporated herein by reference.

BACKGROUND

1. Field

This application relates to streaming media of live events, search engines, and computer networks, including the Internet.

2. Description of Related Art

The Internet continues to grow rapidly as a source of information and entertainment. The number of sources is also rapidly growing. This is in large part attributable to the ease at which organizations and even individuals can make information and entertainment available on the Internet.

Internet search engines, such as Google and Yahoo, are of great help in locating information and entertainment that may be of interest. Unfortunately, traditional search engines may not be updated frequently enough to enable viewers to locate streaming media of live events when they are of interest.

Other efforts have been made to assist viewers in finding such streaming media, as illustrated by the systems and methods described in U.S. Pat. Nos. 6,757,682, 6,721,744, and 6,556,989. The technology described in these patents relies upon viewers of streaming media to issue viewer alerts when the streaming media reaches a point that is likely to be of interest to others. Prospective viewers interested in a particular type of content may then utilize a streaming media search engine to locate streaming media of live events having content of a type that is of interest based on viewer alerts that have recently been issued.

Although helpful, systems of this type can fall short of providing prospective viewers with complete and timely information about the full spectrum of streaming media of live events that may be of interest. For example, the content of the streaming media may change so quickly as to make a viewer alert untimely. Until a viewer stumbles upon and issues a first alert in connection with streaming media that might be of interest, moreover, that streaming media may not even be known to the streaming media search engine.

SUMMARY

A real time streaming video capture, delivery, and alert system may capture a streaming video of a live event and deliver it into a computer network as the live event is being captured. The system may include a camera, a network interface, a source operator interface, and a processing system.

The camera may be configured to generate streaming video of the live event.

The network interface may be configured to controllably deliver into the computer network the streaming video while it is being generated by the camera and a source alert indicative of the streaming video being currently of interest to others, including descriptive information that is descriptive of the streaming video.

The source operator interface may be configured to receive the source alert, including the descriptive information, from an operator of the system before the network interface commences delivering the streaming video into the computer network. The processing system may be configured to cause the network interface to commence delivering the streaming video into the computer network while it is being generated by the camera and, at the commencement or shortly before the delivering of the streaming video into the computer network, to deliver the source alert into the computer network, including the descriptive information.

The source operator interface may be configured to receive the source alert from an operator of the system indicating that the live event is at a point which is currently of interest to prospective viewers after the network interface commences delivering the streaming video into the computer network. The processing system may be configured to cause the network interface to deliver into the computer network the streaming video while it is being generated by the camera and the source alert when it is received from the operator after the network interface commences delivering the streaming video into the computer network.

The network interface may be configured to receive feedback from the computer network relating to the streaming video and the source operator interface may be configured to communicate that feedback to the operator. The feedback may include the number of viewers currently viewing the streaming video, a ranking of the streaming video among streaming videos from other systems, and/or real time comments from viewers of the streaming video.

The network interface may be configured to address the streaming video so that it is delivered over the network to a streaming video distribution server and to address the source alert, including the descriptive information, so that it is delivered over the network to a streaming video search engine. The streaming video distribution server and the streaming video search engine may be at the same Internet domain.

The system may be part of a mobile phone which is configured under the control of the processing system to dial a pre-programmed phone number and to thereafter deliver the streaming video and the source alert, including the descriptive information, to a system that answers this dialed call for processing.

The network interface may be configured to deliver multiple source alerts into the computer network, each indicating that the live event is at a point which is currently of interest to prospective viewers. The source operator interface may be configured to receive the multiple source alerts from the operator after the network interface commences delivering the streaming video into the computer network. The processing system may be configured to cause the network interface to deliver into the computer network the multiple source alerts when each is received from the operator after the network interface commences delivering the streaming video into the computer network.

The source alert may be automated. A sensor system may be configured to sense a condition that is indicative of the live event being at a point which is currently of interest to prospective viewers after the network interface commences delivering the streaming video into the computer network and to generate the source alert based on the sensed condition.

A streaming video search engine may allow prospective viewers to locate at least one streaming video that is currently of interest from among several streaming videos. Each streaming video may be of a live event that is being delivered from a real time streaming video capture, delivery, and alert system into a computer network as the live event is changing. The engine may include a network interface, a memory system, a processing system, a searching system, and a viewer interface.

The network interface may be configured to receive source alerts from a computer network. A source alert may indicate that a real time streaming video capture, delivery, and alert system will shortly begin or has just begun to deliver a streaming video of a live event that is currently of interest as it is being captured by the streaming video capture, delivery, and alert system. A source alert may indicate that a streaming video that is being delivered into a computer network by a real time streaming video capture, delivery, and alert system is at a point after commencement of the streaming video that is currently of interest. Each source alert may include descriptive information originating from the real time streaming video capture, delivery, and alert system that is descriptive of the streaming video, along with source information identifying a network source from where the streaming video may be obtained in real time.

The memory system may be configured to controllably store the descriptive information and the source information.

The processing system may be configured to cause the memory system to store the description information and the source information in a manner that associates the descriptive information from each real time streaming video capture, delivery, and alert system with the source information for the streaming video from that real time streaming video capture, delivery, and alert system.

The searching system may be configured to locate source information about at least one of the streaming videos that is of interest to each prospective viewer based on the descriptive information that is stored in the memory system and search criteria supplied by each prospective viewer that is applied to the descriptive information.

The viewer interface may be configured to communicate to each prospective viewer the source information located by the searching system.

The viewer interface may be configured to receive viewer alerts from viewers of a streaming video, each indicative of the viewer concluding that the streaming video is currently of interest to other perspective viewers. The viewer interface may rank a plurality of the streaming videos based at least in part on the viewer alerts.

The viewer interface may be configured to rank a plurality of the streaming videos based at least in part of the number of viewers that are viewing the plurality of streaming videos.

The network interface may be configured to deliver feedback to each real time streaming video capture, delivery, and alert system relating to the streaming video from the real time streaming video capture, delivery, and alert system.

The viewer interface may be configured to receive a comment from each viewer about a streaming video that is being viewed by the viewer. The feedback to each real time streaming video capture, delivery, and alert system may include the comments from viewers of the streaming video being delivered by the real time streaming video capture, delivery, and alert system, the number of viewers currently viewing the streaming video from the real time streaming video capture, delivery, and alert system, and/or a ranking of the streaming video from the real time streaming video capture, delivery, and alert system among other streaming videos.

The engine may be configured to operate in conjunction with a viewer communication server configured to allow viewers of the same streaming video to communicate among themselves on a common communication channel. The common communication channel may be an audio channel.

Although having been described in connection with streaming video, the engine may be used in connection with any other type of streaming media.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
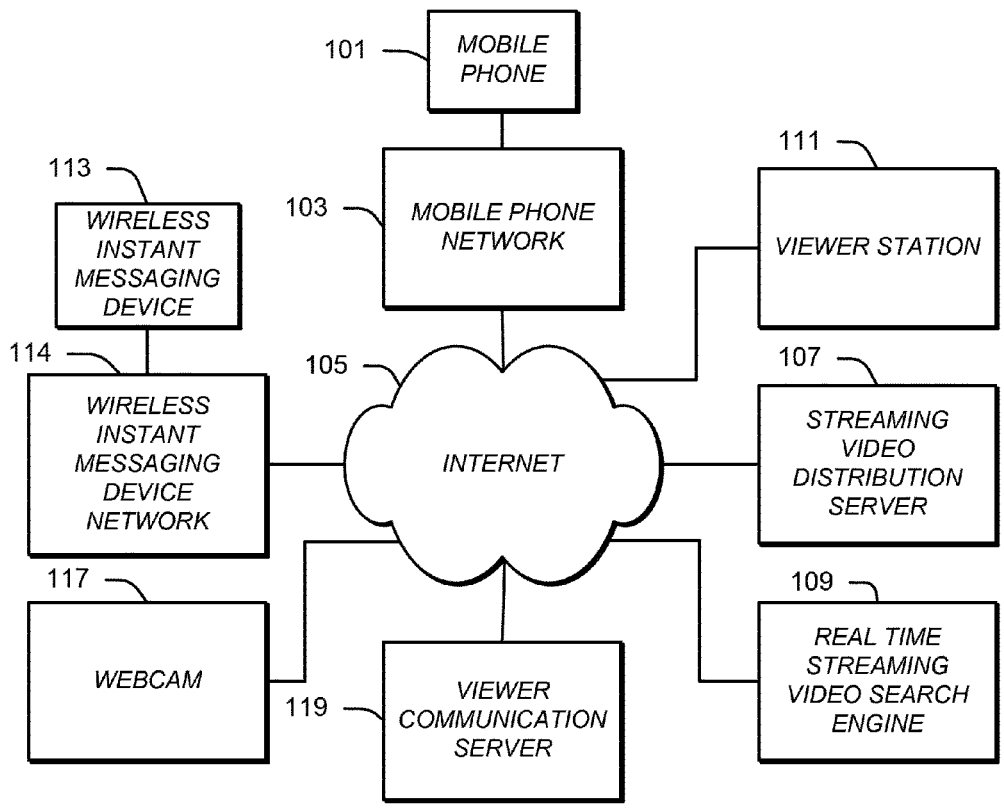
FIG. 1 illustrates an example of a source-based alert and feedback system for videos of current interest that are streaming on one or more computer networks.

FIG. 1 illustrates an example of a source-based alert and feedback system for videos of current interest that are streaming on one or more computer networks.

As shown in FIG. 1, one or more mobile phones, such as mobile phone 101 may be configured to communicate wirelessly with one or more mobile phone networks, such as mobile phone network 103. In turn, each mobile phone network, such as the mobile phone network 103, may be configured to communicate with a different type of computer network, such as the Internet 105. This may be accomplished by using a gateway or any other type of device.

One or more other types of wireless communication devices, such as a wireless instant messaging device 113, may similarly be configured to communicate wirelessly with one or more wireless instant messaging device networks, such as wireless instant messaging device network 114. In turn, each wireless instant messaging device network, such as wireless instant messaging device network 114, may be configured to communicate with a different type of computer network, such as the Internet 105. This may be accomplished by using a gateway or any other type of device.

Other types of communication devices may also be configured to communicate with a network, such as the Internet 105. One example is webcams, such as webcam 117. A webcam, such as the webcam 117, may be mounted on any structure, such as a building, pole, tree, vehicle, or computer monitor. The webcam may be incorporated in a larger device, such as a lap top computer.

Each of these devices, such as the mobile phone 101, the wireless instant messaging device 113, and the webcam 117, may each include or be part of a real time streaming video capture, delivery, and alert system.

Figure 2:
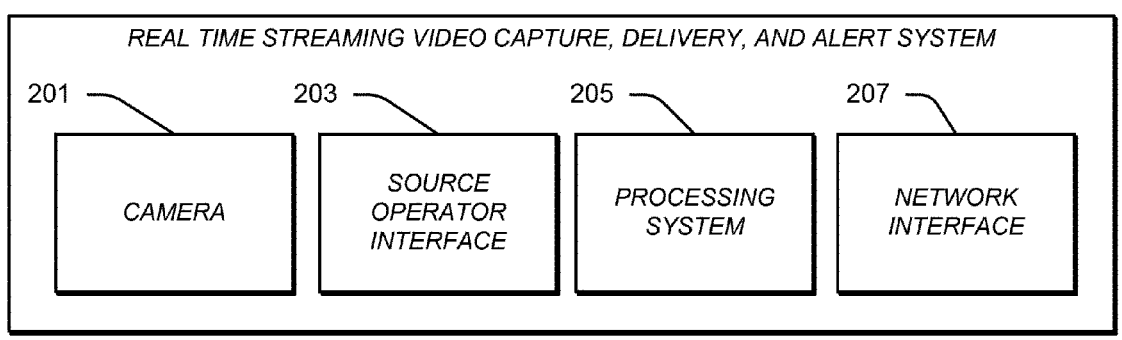
FIG. 2 illustrates an example of a real time streaming video capture, delivery, and alert system that may include or be part of the mobile phone, wireless instant messaging device, and/or webcam illustrated in FIG. 1, and/or any other type of network communication device.

FIG. 2 illustrates an example of a real time streaming video capture, delivery, and alert system that may include or be part of the mobile phone 101, the wireless instant messaging device 113, the webcam 117, and/or any other type of network communication device. As illustrated in FIG. 2, the real time streaming video capture, delivery, and alert system may include a camera 201, a source operator interface 203, a processing system 205, and a network interface 207.

The camera 201 may be any type of device that is configured to generate streaming video of a live event. This streaming video may or may not include audio. When audio is included, the camera 201 may include a sound-capturing device, such as a microphone, to capture sound that is present in the vicinity of the live event. The audio that becomes part of the streaming video may in addition or instead include pre-recorded audio, such as music. The phrase "streaming video" as used herein, is intended to embrace streams that consist of video and audio, or only video.

The video portion of a streaming video may consist of rapidly-changing frames (e.g., 30 frames per second), or frames that only change on a less frequent bases (e.g., 1 frame per minute). The camera 201 may be configured to deliver frames at any desired rate.

The source operator interface 203 may be configured to deliver and receive information of the type described herein, as well as any other type, to and from any operator of the system. The operator may be a person who is manipulating or manning or has custody of the real time streaming video capture, delivery, and alert system, a person that is within the live event being captured by the camera 201, and/or any other person that delivers or receives information from the interface source operator 203. The source operator interface 203 may include a display, a sound-generating device such as a loudspeaker or headphone, one or more lights such as LED's, a keyboard, mechanical buttons, a touch-screen, a mouse, a microphone, and/or any other type of user interface device. The source operator interface 203 may be displayed in response to a operator selecting a particular software application program, such as a webcam application, from among an array of software application programs. This selection may be made by way of a menu, command, and/or through any other means.

The network interface 207 may be configured to deliver and/or receive information into and/or from a computer network, including information of the type discussed herein. The network interface 207 may include hardware and software appropriate for performing these functions, as well as other functions described herein.

The processing system 205 may be configured to perform the functions that are described herein. It may include hardware and software appropriate for performing these functions, including processors, memories, permanent storage, operating systems, and software application programs.

Figure 3:
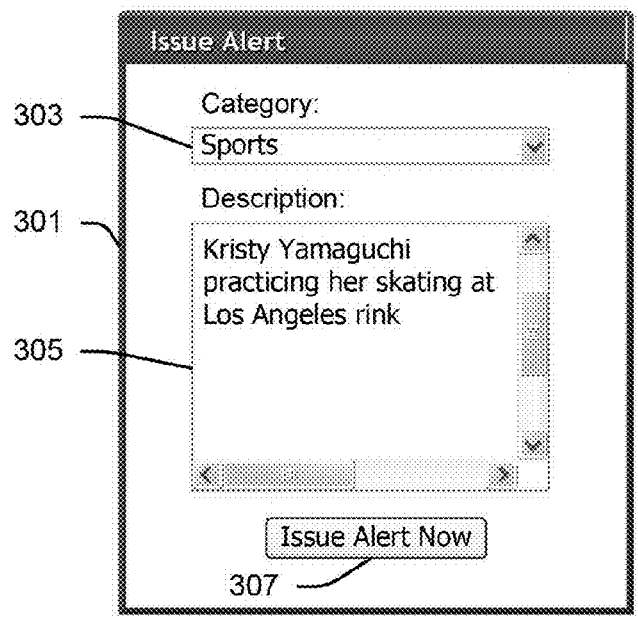
FIG. 3 illustrates an example of an Issue Alert window that may be part of the source operator interface illustrated in FIG. 2.

FIG. 3 illustrates an example of an Issue Alert window that may be part of the source operator interface illustrated in FIG. 2. This window may appear on a display which may be part of the source operator interface 203 in response to the operator selecting a particular software application program to be run, such as a webcam application program. The operator may actuate such an application program at such time that a live event is being witnessed that is at a point that is currently of interest to others.

As illustrated in FIG. 3, the Issue Alert window 301 may include a drop-down combo box 303 which the operator may use to select a category that is descriptive of the live event in some way. The Issue Alert window 301 may include a text box 305 in which the operator may enter further information that is descriptive of the live event in some way.

The drop-down combo box 303 and the text box 305 are merely illustrative of a broad variety of interface elements that may used to prompt the operator to enter descriptive information that is descriptive of the live event and to receive that information form the operator. In another embodiment, for example, the operator may select several descriptive categories. Some or all of the category selections may be part of a hierarchical menu system. Other interface elements may be used in addition or instead, such as radio buttons and/or pick lists. Although the text box 305 is illustrated as having been completed with a description in the form of a sentence, other structures may be used in addition or instead. For example, the operator may be queried to enter descriptive keywords or "tags", without being restricted to choosing from a pre-determined set. Although the operator is prompted in FIG. 3 to enter both free-form words and to pick from a list, the Issue Alert window 301 may only prompt the operator to enter just one or the other, but not both.

The Issue Alert window 301 may prompt the operator to provide other types of descriptive information. For example, the Issue Alert window 301 may prompt a operator to provide an importance assessment relating to the live event, such as a numerical assessment of the perceived importance or likely interest in the live event at the time the assessment is entered or at a later time.

In other embodiments, the Issue Alert window 301 may not present the operator with any prompt or means to enter descriptive information or, even it does, may not require the operator to enter such descriptive information.

After the operator enters the descriptive information in the Issue Alert window 301, the operator may activate the Issue Alert Now button 307. This may be done immediately or the operator may wait until the live event reaches a point that is of significant interest to others. This may cause the source alert, including the descriptive information, to be delivered to the network interface 207.

The source operator interface 203 may communicate information of the type discussed above to the network interface 207 through means other than or in addition to the Issue Alert window 301. For example, the source operator interface 203 may include one or more mechanical buttons for the operator to actuate and/or may receive voice input and/or input through other means.

In response to actuation of the Issue Alert Now button 307, the processing system 205 may be configured to cause the network interface 207 to deliver the source alert, including the descriptive information which the operator has entered in the Issue Alert window 301, into a computer network, such as the mobile phone network 103, the wireless instant messaging device network 114, the Internet 105, or any other type of computer network.

The processing system 205 may also in response to actuation of the Issue Alert Now Button 307 cause the camera 201 to commence capturing the live event by generating streaming video reflective of the live event. This may take place immediately upon actuation of the Issue Alert Now Button 307 or a pre-programmed period of time later. The processing system 205 may cause this streaming video to be delivered into the computer network by the network interface 207 as the streaming video is being generated by the camera 201. In the event that the processing system 205 causes the capturing to commence immediately following activation of the Issue Alert Now Button 307, the streaming video may begin to be delivered into the commuter network immediately following issuance of the source alert or contemporaneously with it. In the event that the processing system 205 causes the capturing to commence a pre-programmed period of time after actuation of the Issue Alert Now Button 307, the source alert may still be delivered into the computer network as soon as the Issue Alert Now Button 307 is actuated, at a later time, or only when the streaming video is about to be captured and delivered.

The network interface 207 may be configured to deliver the streaming video to multiple viewers simultaneously. In this event, the source operator interface may be configured to communicate with each of these viewers in order to exchange the types of information that may be needed to effectuate this multi-viewer streaming, such as the address of the network interface 207 and/or the address of each viewer.

In other embodiments, the network interface 207 may not be capable of delivering the streaming video to multiple viewers or may not have been set up to do so. In these embodiments, the network interface 207 may be configured to deliver a single instance of the streaming video to another device which may perform the distribution to multiple viewers, such as to a streaming video distribution server 107. In the event that the network interface 207 is part of a device which is isolated from the streaming video distribution server 107 by another network, such as the mobile phone 101, the network interface 207 may be configured to deliver the streaming video so that it is received by the intervening network system, such as the mobile phone network 103 in the case of the mobile phone 101, such that the intervening network redirects the streaming video to the streaming video distribution server 107. In the case of the mobile phone, all or portions of this addressing may be performed by a target device that the mobile phone 101 reached by dialing the pre-programmed number discussed above.

The processing system may cause the network interface 207 to address the source alert, including the descriptive information, so that it is delivered to another system, such as to a real time streaming video search engine 109. In the event that the mobile phone 101 is being used, for example, the processing system 205 may cause the network interface 207 to dial a pre-programmed telephone number of a target device that is configured to deliver alerts containing descriptive information that it receives from one or more mobile phones to another system, such as to the real time streaming video search engine 109. In the event that the webcam 117 is being used, as another example, the processing system 205 may cause the network interface 207 in the webcam 117 to address the descriptive information and the associated identifying information to the other system, such as to the real time streaming video search engine 109.

The processing system may cause the network interface to include with the source alert source information identifying a network source from where the streaming video may be obtained. In some embodiments, this may be the address of the real time streaming video capture, delivery, and alert systems. In other embodiments, it may be the address of the streaming video distribution server 107. In still other embodiments, it may be an address at an intervening computer network, such as the mobile phone network 103 or the wireless instant messaging device network 114. In still other embodiments, the source alert may not include source information, while such information may be added to the source alert by an intervening device, such as a station associate with an intervening computer network, such as the mobile phone network 103 or the wireless instant messaging device network 114.

After the network interface 207 has begun delivering the streaming video into the computer network, the operator may issue additional alerts through the source operator interface 203, such as through the use of the Issue Alert window 301. The operator may do so each time the live event has reached or is about to reach a new point that may again be of interest to others or that may be of interested to a different group than was a previous alert. Each time, the processing system 205 may cause the network interface 207 to deliver the source alert into the computer network as soon as the Issue Alert Now button 307 is actuated or at a later time, including any new descriptive information which the operator may have provided.

In some embodiments, such as in connection with a webcam that continuously provides a video stream of a scene, a source alert may not be issued before the streaming video commences. Rather, there may only be one or more later source alerts, i.e., each time the live event is at a point that currently is of interest.

The quantity of data which may be required to communicate a source alert may be sufficiently small to require only minimal bandwidth. The source alert may also be placed by the network interface 207 or by another device which propagates it in a channel and/or stream that is separate from the video stream that is delivered into the network.

Returning back to FIG. 1, one or more viewer stations, such as a viewer station 111, may be communicatively coupled to a network, such as the Internet 105. The viewer stations may be coupled through wired connections, wireless connections and/or a combination of both. The viewer stations may include general purpose computers programmed to participate in one or more of the applications that are described herein, or may include computers that are dedicated to performing one or more of these applications. One or more of the viewer stations may include software and hardware appropriate for communicating with websites on the Internet 105 and/or for viewing and/or listening to streaming media, such as streaming video, received over the Internet 105. They may include one or more displays, keyboards, mice, processing systems, and sound-reproducing devices. One or more of the viewer stations may be at a fixed location or may be mobile.

The streaming video distribution server 107 may be configured to facilitate the distribution of one or more streaming videos to one or more viewers. The streaming video distribution server 107 may be connected to any type of computer network, such as to the Internet 105. It may be configured to receive streaming videos from one or more sources, such as from the mobile phone network 103, the wireless instant messaging device network 114, the webcam 117, or any other communication device, and to distribute replicas of these streaming videos in real-time to one or more viewers. The streaming video distribution server 107 may include appropriate network interfaces to facilitate these functions, as well as appropriate viewer interfaces to facilitate receiving requests for specific video streams from viewers. Although only one streaming video distribution server is illustrated in FIG. 1, there may be several, each distributing different streaming videos.

Figure 4:
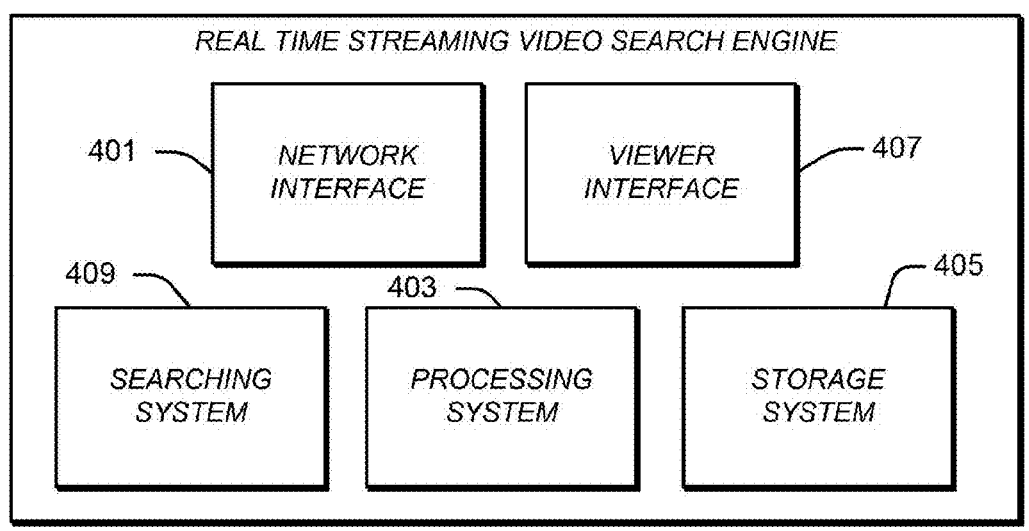
FIG. 4 illustrates an example of the real time streaming video search engine illustrated in FIG. 1.

FIG. 4 illustrates an example of the real time real time streaming video search engine 109 in FIG. 1. The real time streaming video search engine 109 may also be configured in accordance with some or all of the teachings in U.S. Pat. Nos. 6,757,682, 6,721,744, and 6,556,989, as well as in a way that implements some or all of the functions which are described in these patents. These configurations and functions will not be repeated here in detail, but rather are incorporated herein by reference. Although only one real time streaming video search engine is illustrated in FIG. 1, they may be several, each having different libraries of information, servicing different viewers, configured differently, and/or provided for load balancing.

As shown in FIG. 4, the real time streaming video search engine 109 may include a network interface 401. The network interface 401 may be configured to receive the source alerts, including the descriptive information from the real time streaming video capture, delivery, and alert systems.

The network interface 401 may also be configured to receive source information identifying a network source from which each streaming video may be obtained. In some cases, the source of the streaming video may be the network address of the real time streaming video capture, delivery, and alert system. In other cases, it may be the address of a streaming video distribution server which is distributing this streaming video, such as the streaming video distribution server 107. This source information may come from the real time streaming video capture, delivery, and alert systems, the streaming video distribution servers, an intervening processing system, and/or elsewhere.

A processing system 403 may be configured to cause the information that is received by the network interface 401, such as the source alerts, including the descriptive information and the source information, to be stored in a storage system, such as the storage system 405. The storage system 405 may be any type of storage system, such as RAM and/or hard drives. It may include appropriate software and sub-processing systems, such as database management systems, to structure the information and to facilitate its identification and delivery.

The real time streaming video search engine 109 may include a viewer interface, such as a viewer interface 407. The viewer interface 407 may be configured to communicate information to and/or to receive information from viewers of the real time streaming video search engine, such as viewers that access the real time streaming video search engine from one or more viewer stations, such as the viewer station 111. The viewer interface 407 may be configured to communicate with these viewers in the ways described below and/or in other ways, including one or more of the ways described in U.S. Pat. Nos. 6,757,682, 6,721,744, and 6,556,989.

Figure 5:
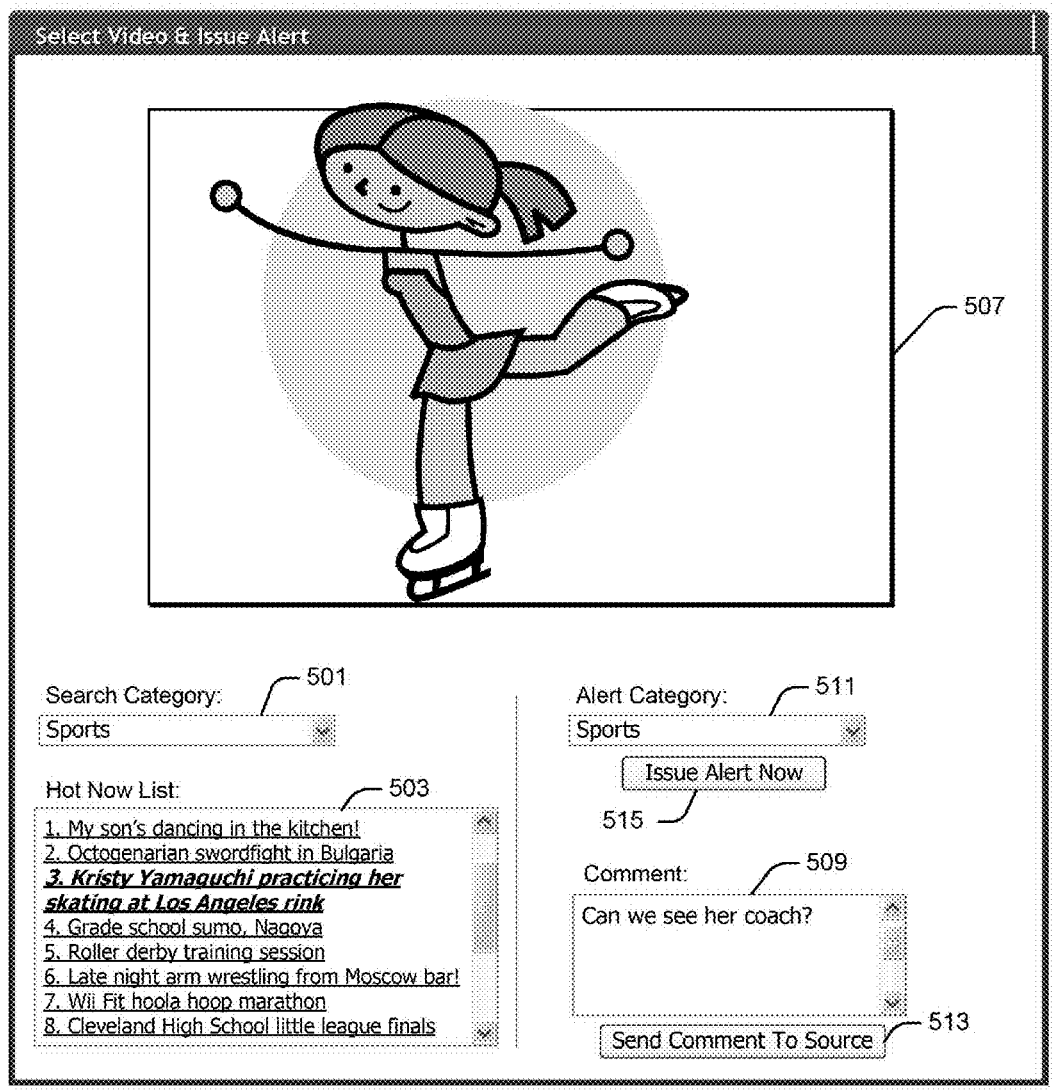
FIG. 5 illustrates an example of a Select Video & Issue Alert window that may be a part of the viewer interface illustrated in FIG. 4.

FIG. 5 illustrates an example of a Select Video & Issue Alert window that may be part of the viewer interface 407 illustrated in FIG. 4. As shown in FIG. 5, a viewer visiting the real time streaming video search engine 109 may be presented with a drop-down combo box 501 which the viewer may use to select a category of streaming videos which is of interest. This selection may be used as searching criteria by a searching system, such as a searching system 409, in order to locate streaming videos for which a source alert has been received and stored in the storage system 405. The searching system 409 may include appropriate software that locates the streaming videos that have descriptive information which matches or closely matches the descriptive information provided by the user of the real time streaming video search engine 109.

Although FIG. 5 limits the viewer to a single category as the descriptive information, additional or different types of descriptive information may be received. For example, multiple categories may be received, a hierarchical menu system may be provided, key words may be freely entered without being restricted to a pre-determined set, and Boolean search equations may be formed based on multiple search criteria. The data which is searched by the searching system 409 may include any or all of the descriptive information which is received from each real time streaming video capture, delivery, and alert system, such as the free-form descriptive information that may have been placed in the text box 305 as well as the category selection that may have been made with the drop-down combo box 303.

Other criteria may also factor into the searching which is done by the searching system 409. As described in more detail in U.S. Pat. Nos. 6,757,682, 6,721,744, and 6,556,989, the searching system 409 may search for streaming videos for which no source alert has been received from a real time streaming video capture, delivery, and alert system, but for which one or more viewer alerts have been received by one or more viewers of these streaming videos. As explained in these patents, the storage system 405 (referred to as a database in these patents) may also keep track of other information, such as the number of viewers which are viewing each streaming video. The searching system 409 may similarly output information about these other streaming videos, even if they are not the subject of any alert, or even if they are only the subject of a viewer alert (as opposed to a source alert). In still further embodiments, criteria other than descriptive information may be used by this searching system 409 to locate streaming videos identified in the storage system 405.

Information about the matches (or close matches) that are located by the searching system 409 in the storage system 405 may be communicated to the user through the viewer interface 407, such as in the text box 503 shown in FIG. 5. Any type of information may be displayed, such as the descriptions which operators may have provided about the streaming videos in text boxes like the text box 305. These descriptions may be in the form of a link which points to an address at which the streaming video may be obtained in real time. This address may be the address of the real time streaming video capture, delivery, and alert system itself (if it is capable of supplying simultaneous streams to multiple viewers), the address of a video distribution server which is providing this functionality, such as the streaming video distribution server 107, or the address of any other type of device from where the streaming video may be obtained in real-time.

Other types of information may be provided in addition or instead of an address, such as a full listing of all categories that may have been assigned to the streaming video at the real time streaming video capture, delivery, and alert systems, comments which may have been provided about the streaming video by one or more other viewers, any importance assessments that may have been entered at the real time streaming video capture, delivery, and alert system and/or by any of the viewers of the video stream, and/or any other type of information.

The list of matches may be ranked in an order that may assist the prospective viewer in deciding which particular streaming videos to watch. The ranking may be based upon the number of viewers that are currently viewing the streaming video, the importance assessments that may have been assigned to any streaming video at the real time streaming video capture, delivery, and alert system and/or by its viewers, the number of viewer alerts that may have been issued in connection with the streaming video at the real time streaming video capture, delivery, and alert system and/or by viewers, and/or by any combination of these criteria. The ranking of each match may also be set to automatically decay based on one or more factors, such as the age of source alerts and/or viewer alerts. Details about particular approaches that may be used are set forth in U.S. Pat. Nos. 6,757,682, 6,721,744, and 6,556,989 and incorporated herein by reference.

The processing system 403 may be configured to cause any ranking that is assigned by the searching system 409 to be communicated to the viewer, such as by causing the list of matching descriptions to be displayed in order of their ranking in the text box 503, as illustrated in FIG. 5. All or portions of the information on which the ranking is based could in addition be communicated by stating the ranking along with the description, such as in a parenthetical following the description.

In some embodiments, the real time streaming video search engine 109 may display any streaming video which the viewer selects from in the text box 503. In FIG. 5, for example, site 245 has been selected by the viewer, as reflected by its bold and italicized font in the text box 503 and by a frame of the streaming video from this server being displayed in a streaming video window 507. The viewer may view other matching descriptions by selecting them. The real time streaming video search engine 109 may be configured to display only a single selection at a time, as illustrated in FIG. 5, or multiple selections.

In order to display a streaming video that is selected, the real time streaming video search engine 109 may be configured to communicate with another device that is able to provide a real-time copy of the streaming video, such as the streaming video distribution server 107, the mobile phone 101, the wireless instant messaging device 113, the webcam 117, and/or any other device. The real time streaming video search engine 109 may do so by referring to the source information that was included with the source alert that was associated with the streaming video and stored in the storage system.

In some embodiments, the streaming video distribution server 107 and the real time streaming video search engine 109 may be part of the same computer system and thus may be at the same Internet domain. In other embodiments, selecting a URL in the text box 503 may merely result in the viewer being redirected to another server, such as to the streaming video distribution server 107, at which the viewer may view the desired streaming video.

At any point while a viewer is viewing a streaming video, the viewer may be able to actuate an Issue Alert Now button 515. This may cause a viewer alert to be registered in the storage system 405, which thereafter may be used by the searching system 409 to enhance the ranking of the video when later searched by other viewers, particularly when the source alert is relatively fresh.

As part of this viewer alert, the viewer may provide his or her own descriptive information, such as by selecting a category in a drop down combo box 511, and by then actuating the Issue Alert Now button 515. Free-form tags, an importance assessment, comments, and/or any other type of descriptive information may be provided in addition or instead. This descriptive information may similarly be stored in the storage system 405, searched by the searching system 409 when looking for streaming videos of interest to other viewers, and/or delivered to other viewers who are viewing or are considering viewing this same streaming video.

The viewer interface 407 may allow viewers to issue viewer alerts and provide any of the other types of related information in ways other than have been described above, such as in ways that were discussed above in connection with the Issue Alert window 301.

A viewer of a streaming video may elect to a send a comment to the real time streaming video capture, delivery, and alert system which is providing the streaming video being watched by entering the comment in a text box 509 and thereafter actuating a Send Comment to Source button 513. The comment may include a request or a suggestion for a change in the live event which is being captured and/or a change in the way the event is being captured. In addition to or in lieu of a text box, the viewer may be prompted to select one or more pre-determined comments. Other ways to receive and deliver such comments may be used in addition or instead, such as voice input.

The processing system 403 may be configured to cause the network interface 401 to deliver any comments which viewers may provide after the Send Comment to Source button 513 is actuated to the streaming video capture, delivery, and alert system that is delivering the streaming video which the viewer is watching.

The processing system 403 may be configured to cause the network interface 401 in addition or instead to deliver other feedback to the real time streaming video capture, delivery, and alert system, such as the number of viewers currently watching the streaming video from the real time streaming video capture, delivery, and alert system, and/or the rank of the streaming video among other streaming videos, such as streaming videos being delivered by other real time streaming video capture, delivery, and alert systems.

Figure 6:
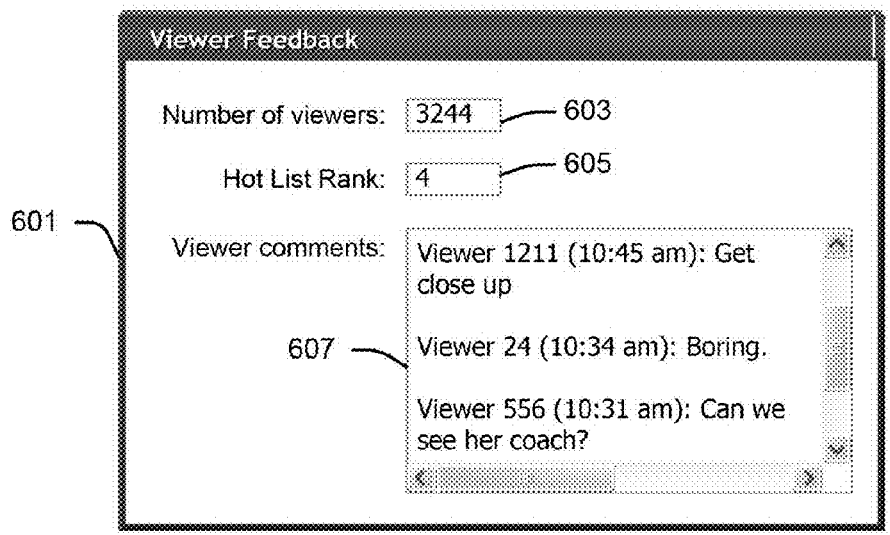
FIG. 6 illustrates an example of a Viewer Feedback window that may be a part of the source operator interface illustrated in FIG. 2.

The source operator interface 203 of each real time streaming video capture, delivery, and alert system may be configured to communicate this feedback to the operator of the real time streaming video capture, delivery, and alert system and/or to anyone else. FIG. 6 illustrates an example of a Viewer Feedback window that may be part of the source operator interface 203 illustrated in FIG. 2. As shown in FIG. 6, a Viewer Feedback window 601 may include a text box 603 listing the number of viewers that are currently viewing the streaming video that is being delivered by the real time streaming video capture, delivery, and alert system, a text box 605 setting forth the rank of the streaming video among other streaming videos, and a viewer comment text box 607 displaying comments that viewers have made, including, in this embodiment, the time at which each comment was made. Feedback of a different type may be provided in addition or instead.

Although the feedback is illustrated in FIG. 6 as being provided in a window, the feedback may in addition or instead be provided through other means, such as through headphones, a loudspeaker, and/or panel lights.

As explained above, source alerts may be issued during a live event when the live event reaches a point that is currently of interest to others. In some embodiments, it may be impractical or undesirable for a human to watch a live event and issue a source alert each time the live event becomes of current interest to others. Webcams which are continuously streaming a live event may be an example. In these situations, source alerts may be issued by the real time streaming video capture, delivery, and alert system through means other than human intervention.

Figure 7:
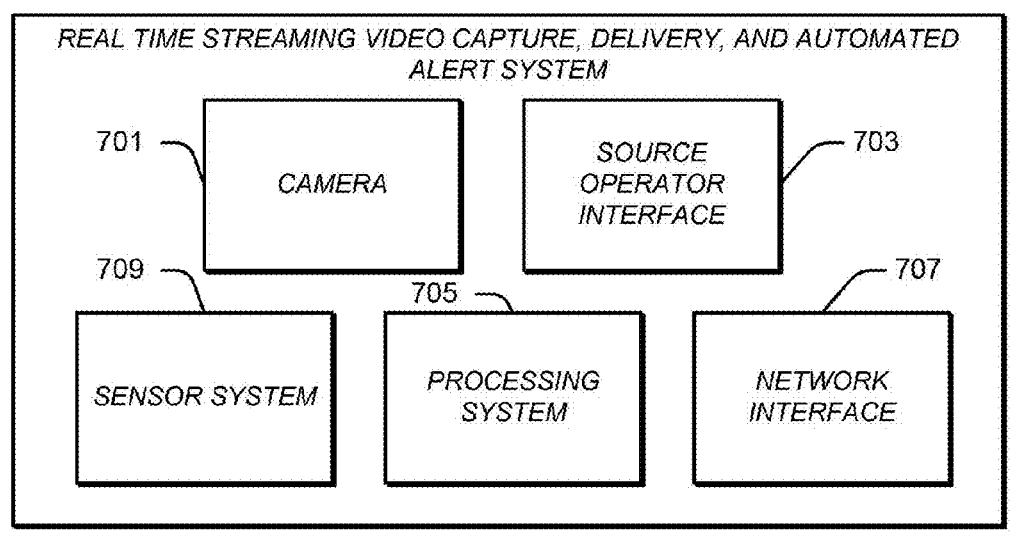
FIG. 7 illustrates an example of an real time streaming video capture, delivery, and automated alert system that may include or be part of the mobile phone, wireless instant messaging device, and/or webcam illustrated in FIG. 1 and/or any other communication device.

FIG. 7 illustrates an example of a real time streaming video capture, delivery, and automated alert system that may be used to automatically issue source alerts. The real time streaming video capture, delivery, and automated alert system may include a camera 701, a source operator interface 703, a processing system 705, a network interface 707, and a sensor system 709. The camera 701, the source operator interface 703, the processing system 705, and the network interface 707 may be the same as or similar to any of the corresponding cameras, source operator interfaces, processing systems, and network interfaces that were discussed above in connection with FIG. 2.

The sensor system 709 may be configured to sense a condition while a streaming video is being delivered by the network interface 707 into a computer network that is indicative of the live event being at point which is currently of interest to perspective viewers. Upon sensing this condition, the processing system 705 may be configured to generate a source alert and to cause the network interface 707 to deliver this source alert into the computer network, just as the network interface 207 delivered source alerts in connection with the embodiment discussed above in connection with FIG. 2.

The sensor system 709 may include any type sensor, Its choice may depend upon the type of condition which is needed to signal a source alert. For example, a movement sensor may be used to automatically signal the appearance of a rare bird landing on a perch. The movement sensor may be an ultrasonic sensor, infrared sensor, or video recognition software that recognizes the presence of the rare bird within frames captured by the camera 701. Any other type of sensor may be used in addition or instead, such as a temperature sensor, smoke sensor, humidity sensor, vibration sensor, or sound sensor. More than a single type of sensor may be used, in which case a combination of sensor outputs may be required as a condition of generating a source alert.

Beyond signaling the occurrence of a condition, the sensor system 709 may be configured to provide descriptive information which is descriptive of the streaming video, such as the temperature, humidity, amount of vibration, of degree of loudness. The processing system 705 may similarly cause the network interface 207 to deliver this descriptive information into the computer network, again just like the network interface 207 did in connection with the embodiment discussed above in connection with FIG. 2.

A viewer communication server 119 may be provided, as illustrated in FIG. 1. Such a server may be connected to a computer network to which viewer stations are connected, such as the viewer station 111. The viewer communication server 119 may be configured to create separate communication channels, one for each streaming video that is being viewed. All viewers watching a particular streaming video may utilize the viewer communication server 119 to communicate among themselves about the streaming video, such as through the use of voice comments, text messages, and/or video webcams. In certain embodiments, the network interface 401 of the real time streaming video search engine may be configured to cause viewer communication from the viewer communication server 119 to be delivered to the source operator interface 203 of the real time streaming video capture, delivery, and alert system that is delivering the streaming video to which the viewer communication channel has been assigned, so that this communication can be monitored at the viewer camera system. In certain embodiments, the operator of the real time streaming video capture, delivery, and alert system may be allowed to participate in the viewer communication through the viewer communication server 119.

The various components that have been discussed may be made from combinations of hardware and/or software, including operating systems and software application programs that are configured to implement the various functions that have been ascribed to these components above and in the claims below. These components include, without limitation, the various mobile phones, mobile phone networks, wireless instant messaging devices, wireless instant messaging device networks, webcams, viewer stations, viewer communication servers, streaming video distribution servers, real time streaming video search engines, cameras, source operator interfaces, processing systems, viewer interfaces, network interfaces, searching systems, storage systems, and sensor systems that have been discussed and illustrated.

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

For example, although having been discussed in the context of streaming videos, the systems and methods which have been described may be used in connection with other types of streaming media, such as streaming audio (without a video track), streaming text, streaming RSS feeds, and/or streaming information of any other type. These systems and methods may also be used in connection with non-streaming content which is rapidly changing, such as rapidly-changing news reports that are being delivered to a website.

In connection with these other embodiments, appropriate modifications may be made to the source operator interface 203 and the network interface 207 that are at the source of these other types of rapidly-changing content so as to provide appropriate source alerts, including descriptive information, and so as to provide and receive other appropriate information, all as described above in connection with the real time streaming video capture, delivery, and alert systems. The other components which have been discussed in connection with the real time streaming video capture, delivery, and alert systems may be configured and may function in comparable ways, adjusted as needed to adapt to the different type of rapidly changing content.

Also, the viewer interface 407 in the real time streaming video search engine may be configured to receive, store and process subscriptions to source and/or viewer alerts that are received by the real time streaming video search engine that match or closely match specified search criteria, such as the search category 501. As part of this, the source operator interface 407 may be configured to receive one or more addresses to which such alerts should be forwarded, such as an address of a website, an email box, an instant messaging device, a mobile phone, and/or a stationary phone. In the event that the remote device is a phone, the source operator interface 407 may be configured to receive and store the phone number of the phone, to deliver notice of each matching alert by dialing the phone number, and, after it is answered, to provide notice of the alert in an audible or, if requested and compatible with the phone, visual message. If the phone or other remote device is capable of displaying the streaming video, and if requested by the prospective viewer of the alert notice, the processing system 403 of the real time streaming video search engine may be configured to cause the streaming video to be delivered in real time to the prospective viewer.

The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents.

We claim:

1. A streaming video search engine for allowing prospective viewers to locate at least one streaming video that is currently of interest from among several streaming videos, each streaming video being of a live event that is being delivered from a real time streaming video capture, delivery, and alert system into a computer network as the live event is changing, comprising:
    a network interface including computer hardware configured to receive source alerts from a real time streaming video capture, delivery, and alert system, each source alert indicating that a real time streaming video capture, delivery, and alert system will shortly begin or has just begun to deliver a streaming video of a live event that is currently of interest as it is being captured by the streaming video capture, delivery, and alert system, each source alert including descriptive information originating from the real time streaming video capture, delivery, and alert system that is descriptive of the streaming video, along with source information identifying a network source from where the streaming video may be obtained in real time;
    a memory system including computer hardware configured to controllably store the descriptive information and the source information;
    a processing system including computer hardware configured to cause the memory system to store the description information and the source information in a manner that associates the descriptive information from each real time streaming video capture, delivery, and alert system with the source information for the streaming video from that real time streaming video capture, delivery, and alert system;
    a searching system including computer hardware configured to locate source information about at least one of the streaming videos that is of interest to each prospective viewer based on the descriptive information that is stored in the memory system and search criteria supplied by each prospective viewer that is applied to the descriptive information; and
    a viewer interface including computer hardware configured to communicate to each prospective viewer the source information located by the searching system.

2. The streaming video search engine of claim 1 wherein the viewer interface is further configured to:
    receive viewer alerts from viewers of a streaming video, each indicative of the viewer concluding that the streaming video is currently of interest to other prospective viewers; and
    rank a plurality of the streaming videos based at least in part of the viewer alerts.

3. The streaming video search engine of claim 1 wherein the viewer interface is further configured to rank a plurality of the streaming videos based at least in part of the number of viewers that are viewing the plurality of streaming videos.

4. The streaming video search engine of claim 1 wherein the network interface is configured to deliver feedback to each real time streaming video capture, delivery, and alert system relating to the streaming video from the real time streaming video capture, delivery, and alert system.

5. The streaming video search engine of claim 4 wherein the viewer interface is further configured to receive a comment from each viewer about a streaming video that is being viewed by the viewer and wherein the feedback to each real time streaming video capture, delivery, and alert system includes the comments from viewers of the streaming video being delivered by the real time streaming video capture, delivery, and alert system.

6. The streaming video search engine of claim 4 wherein the feedback includes the number of viewers currently viewing the streaming video from the real time streaming video capture, delivery, and alert system.

7. The streaming video search engine of claim 4 wherein the feedback includes a ranking of the streaming video from the real time streaming video capture, delivery, and alert system among other streaming videos.

8. The streaming video search engine of claim 1 further comprising a viewer communication server configured to allow viewers of the same streaming video to communicate among themselves on a common channel.

9. The streaming video search engine of claim 8 wherein the common communication channel is an audio channel.

10. A streaming media search engine for allowing prospective viewers to locate at least one streaming media that is of current interest from among several streaming media, each streaming media being of a live event that is being delivered from a streaming media delivery and alert system into a computer network as the live event is changing, comprising:
    a network interface including computer hardware configured to receive source alerts from a real time streaming video capture, delivery, and alert system, each source alert indicating that a streaming media delivery and alert system will shortly begin or has just begun to deliver a streaming video of an live event that is currently of interest, each source alert including descriptive information originating from the streaming media delivery and alert system that is descriptive of the streaming media, along with source information identifying a network source from where the streaming media may be obtained in real time;
    a memory system including computer hardware configured to controllably store the descriptive information and source information;
    a processing system including computer hardware configured to cause the memory system to store the description information and the source information in a manner that associates the descriptive information from each streaming media delivery and alert system with the source for the streaming video from that streaming media delivery and alert system;

a searching system configured to locate source information about at least one of the streaming media that is of interest to each prospective viewer based on the descriptive information that is stored in the memory system and search criteria supplied by each prospective viewer that is applied to the descriptive information; and a viewer interface including computer hardware configured to communicate to each prospective viewer the source information located by the searching system.

11. A streaming video search engine for allowing prospective viewers to locate at least one streaming video that is currently of interest from among several streaming videos, each streaming video being of a live event that is being delivered from a streaming video capture, delivery, and alert system into a computer network as the live event is changing, comprising:

a network interface including computer hardware configured to receive source alerts from a real time streaming video capture, delivery, and alert system, each source alert indicating that a streaming video that is being delivered into a computer network by a real time streaming video capture, delivery, and alert system is at a point after commencement of the streaming video that is currently of interest, along with source information identifying a network source from where the streaming video may be obtained in real time; and a viewer interface including computer hardware configured to communicate to each of the prospective viewers an identification of one or more of the streaming videos for which a source alert has been received, wherein the viewer interface is further configured to:
receive viewer alerts from viewers of a streaming video, each indicative of the viewer concluding that the streaming video is at point that is currently of interest to other prospective viewers; and
rank a plurality of the streaming videos based at least in part of the viewer alerts.

12. A streaming video search engine for allowing prospective viewers to locate at least one streaming video that is currently of interest from among several streaming videos, each streaming video being of a live event that is being delivered from a streaming video capture, delivery, and alert system into a computer network as the live event is changing, comprising:

a network interface including computer hardware configured to receive source alerts from a real time streaming video capture, delivery, and alert system, each source alert indicating that a streaming video that is being delivered into a computer network by a real time streaming video capture, delivery, and alert system is at a point after commencement of the streaming video that is currently of interest, along with source information identifying a network source from where the streaming video may be obtained in real time; and a viewer interface including computer hardware configured to communicate to each of the prospective viewers an identification of one or more of the streaming videos for which a source alert has been received, wherein the viewer interface is further configured to rank a plurality of the streaming videos based at least in part of the number of viewers that are viewing the plurality of the streaming videos.

13. A streaming video search engine for allowing prospective viewers to locate at least one streaming video that is currently of interest from among several streaming videos, each streaming video being of a live event that is being delivered from a streaming video capture, delivery, and alert system into a computer network as the live event is changing, comprising:

a network interface including computer hardware configured to receive source alerts from a real time streaming video capture, delivery, and alert system, each source alert indicating that a streaming video that is being delivered into a computer network by a real time streaming video capture, delivery, and alert system is at a point after commencement of the streaming video that is currently of interest, along with source information identifying a network source from where the streaming video may be obtained in real time; and a viewer interface including computer hardware configured to communicate to each of the prospective viewers an identification of one or more of the streaming videos for which a source alert has been received, wherein the network interface is configured to deliver feedback to each real time streaming video capture, delivery, and alert system relating to the streaming video from the real time streaming video capture, delivery, and alert system.

14. The streaming video search engine of claim 13 wherein the viewer interface is further configured to receive a comment from each viewer about a streaming video that is being viewer by the viewer and wherein the feedback to each real time streaming video capture, delivery, and alert system includes the comments from viewers of the streaming video being delivered by the real time streaming video capture, delivery, and alert system.

15. The streaming video search engine of claim 13 wherein the feedback includes the number of viewers currently viewing the streaming video from the real time streaming video capture, delivery, and alert system.

16. The streaming video search engine of claim 13 wherein the feedback includes a ranking of the streaming video from the real time streaming video capture, delivery, and alert system among other streaming videos.

17. A streaming video search engine for allowing prospective viewers to locate at least one streaming video that is currently of interest from among several streaming videos, each streaming video being of a live event that is being delivered from a streaming video capture, delivery, and alert system into a computer network as the live event is changing, comprising:

a network interface including computer hardware configured to receive source alerts from a real time streaming video capture, delivery, and alert system, each source alert indicating that a streaming video that is being delivered into a computer network by a real time streaming video capture, delivery, and alert system is at a point after commencement of the streaming video that is currently of interest, along with source information identifying a network source from where the streaming video may be obtained in real time;

a viewer interface including computer hardware configured to communicate to each of the prospective viewers an identification of one or more of the streaming videos for which a source alert has been received; and a viewer communication server configured to allow viewers of the same streaming video to communicate among themselves on a common channel.

18. The streaming video search engine of claim 17 wherein the common communication channel is an audio channel.

* * * * *